United States Patent [19]
Perraud

[11] Patent Number: 5,838,149
[45] Date of Patent: Nov. 17, 1998

[54] VOLTAGE CONTROL MEANS HAVING A REDUCED SENSITIVITY TO TEMPERATURE VARIATIONS

[75] Inventor: Jean-Claude Perraud, Saint Aubin/Mer, France

[73] Assignee: U.S. Philips Corporation, New York, N.Y.

[21] Appl. No.: 918,969

[22] Filed: Aug. 27, 1997

[30] Foreign Application Priority Data

Aug. 30, 1996 [FR] France .................................. 96 10645

[51] Int. Cl.$^6$ ..................................................... G05F 3/00
[52] U.S. Cl. .............................. 323/315; 327/55; 330/257
[58] Field of Search ...................................... 323/312, 313, 323/314, 315, 316, 907; 327/52, 53, 54, 55; 330/252, 257

[56] References Cited

U.S. PATENT DOCUMENTS

| | | | |
|---|---|---|---|
| 4,442,400 | 4/1984 | Nagano | 323/315 |
| 5,357,188 | 10/1994 | Takeda et al. | 323/315 |
| 5,521,544 | 5/1996 | Hatanaka | 323/315 X |

OTHER PUBLICATIONS

"201 Analog Designs", p. 25, paragraph 64, published by the Interdesign Society, no date.

*Primary Examiner*—Peter S. Wong
*Assistant Examiner*—Y. J. Han

[57] ABSTRACT

The invention relates to a voltage control means provided with a first and a second transistor T1 and T2 constituting a differential pair, the base of the first transistor T1 being intended to receive a reference voltage Vref, the base of the second transistor T2 being intended to receive a predetermined fraction Vs of a voltage applied to a power supply terminal VDD, and also provided with a first current mirror M1 and a second current mirror M2, each having its input connected to the collector of one of the transistors and its output connected to the collector of the other transistor, the output current of each mirror being K times larger than the input current. According to the invention, a resistor R is inserted in the connection between the emitters of the first and second transistors T1 and T2, and the voltage control means is provided with injection means for injecting into the collector of each transistor a current equal to Q times its own bias current, in which Q is a predetermined real number, and signalization means allowing supply of a current Iout at an output terminal, which current is proportional to the input current of one of the current mirrors M1 and M2.

6 Claims, 1 Drawing Sheet

VOLTAGE CONTROL MEANS HAVING A REDUCED SENSITIVITY TO TEMPERATURE VARIATIONS

BACKGROUND OF THE INVENTION

The invention relates to a voltage control means having a first and a second power supply terminal and an output terminal, provided with a first and a second transistor constituting a differential pair, whose emitters are connected by means of a connection, the base of the first transistor being intended to receive a reference voltage, the base of the second transistor being intended to receive a predetermined fraction of a voltage applied to the first power supply terminal, said voltage control means being also provided with a first and a second current mirror each having a power supply point connected to the first power supply terminal, an input branch intended to receive an input current and an output branch intended to supply an output current, each current mirror being constructed in such a way that its output current is equal to K times its input current, in which K is a predetermined real number, the input branches of the first and second current mirrors being connected to the collectors of the first and second transistors, respectively, the output branches of the first and second current mirrors being connected to the collectors of the second and first transistors, respectively.

A voltage control means of this type is described in "201 Analog Designs", p. 25, paragraph 64, published by the Interdesign Society. This voltage control means is particularly intended for voltage regulation applications. Its function is to compare a voltage to be regulated with a reference voltage. To prevent oscillatory phenomena from occurring, when the voltage to be regulated oscillates near said reference voltage, by the effect of successive corrections induced by the comparison result, the above-mentioned control means has two switching thresholds with which a hysteresis effect can be generated: when the voltage to be regulated exceeds a first threshold, referred to as high threshold, an output signal is activated at the output terminal and indicates this overshoot to a circuit with which the value of the voltage to be regulated can be modified so that the value of said voltage can be reduced. When this voltage decreases until crossing a second threshold, referred to as low threshold, whose value is smaller than that of the high threshold, the output signal is rendered inactive, which induces another increase of the voltage to be regulated. If Vref is the reference voltage, the high and low thresholds obtained by means of this control means are Vref+Vt.ln(K) and Vref−Vt.ln(K), respectively, in which Vt is equal to $K_B$.T/q, in which $K_B$ is the Boltzmann constant, T is the absolute temperature and q is the electron charge. It thus appears that the value of the thresholds is proportional to the temperature, which implies that the accuracy with which the voltage is regulated strongly depends on the situation in which this voltage control means is used. These variations may become particularly apparent in applications in which the control means is integrated in a portable apparatus such as, for example a cellular telephone. Indeed, the temperature at which the apparatus is submitted is variable as a function of the physical environment in which the user is present, thus involving considerable variations in the operating quality of the apparatus, which is unacceptable.

OBJECT AND SUMMARY OF THE INVENTION

It is an object of the invention to remedy this drawback to a great extent by providing a voltage control means in which the amplitude of the variations of the switching threshold values as a function of the temperature variations is considerably attenuated.

According to the invention, a voltage control means as defined in the opening paragraph is characterized in that a resistor is inserted in the connection between the emitters of the first and second transistors, which emitters are connected to the second power supply terminal via current sources each supplying a bias current, in that it is provided with injection means for injecting into the collector of each first and second transistor, a current equal to Q times its own bias current, in which Q is a predetermined real number, and in that it is provided with signalization means allowing supply of a current at its output terminal, which current is proportional to the input current of one of the first or second current mirrors.

In such a voltage control means, the high threshold may be expressed as Vref+R.x.I+Vt.ln((1+x)/(1−x)), while the low threshold may be expressed as Vref−R.x.I−Vt.ln((1+x)/(1−x)), in which expressions I is the value of the bias current, R is the value of the resistor inserted in the connection between the emitters of the first and second transistors, and x is the proportion of the bias current flowing through said resistor at the switching instants. This proportion is exclusively dependent on the parameters K and Q. By a judicious choice of these parameters, it is thus possible to cause the ratio (1+x)/(1−x) to tend towards 1 and thus considerably reduce the influence of temperature on the values of the high and low thresholds.

An embodiment of the voltage control means according to the invention, as described above, is characterized in that the injection means comprise a third, a fourth, a fifth and a sixth current mirror, each having a power supply point, an input branch intended to receive an input current, and an output branch intended to supply an output current, the input branch of each third and fourth current mirror being intended to receive the bias current of the first and the second transistor, respectively, the power supply points of the third and fourth current mirrors being connected to the second power supply terminal, the input branches of the fifth and sixth current mirrors being connected to the output branches of the third and fourth current mirrors, respectively, the output branches of the fifth and sixth current mirrors being connected to the collectors of the first and second transistors, respectively, the power supply points of the fifth and sixth current mirrors being connected to the first power supply terminal, the third, fourth, fifth and sixth current mirrors being constructed in such a way that the output currents of the fifth and sixth current mirrors are equal to Q times the input currents of the third and fourth current mirrors, respectively.

In a particular embodiment, a voltage control means as described above is characterized in that the third and fourth current mirrors are constructed in such a way that their output current is equal to Q times their input current, and in that the fifth and sixth current mirrors are constructed in such a way that their output current is equal to their input current.

A particular embodiment of a voltage control means according to the invention, as described above, is characterized in that, the first and second transistors having a given polarity, the third and fourth current mirrors are constituted by transistors all having the same polarity as the first and second transistors, and in that the first, second, fifth and sixth current mirrors are constituted by transistors all having a polarity which is inverse to that of the first and second transistors.

In a particular embodiment, a voltage control means as described above is characterized in that the first and second transistors are NPN transistors.

An advantageous embodiment of the invention provides a voltage control means as described above, in which the first current mirror is constituted by a third and a fourth transistor and the second current mirror is constituted by a fifth and a sixth transistor, the fourth and sixth transistors being K times larger than the third and fifth transistors, respectively, the bases of the fourth and sixth transistors being connected to the bases and collectors of the third and fifth transistors, respectively, the emitters of the third and fifth transistors being connected to the emitters of the fourth and sixth transistors, respectively, and constituting the power supply points of the first and second current mirrors, respectively, said power supply points being connected to the first power supply terminal, the collectors of the third and fifth transistors constituting the input branches of the first and second current mirrors, respectively, the collectors of the fourth and sixth transistors constituting the output branches of the first and second current mirrors, respectively, characterized in that the signalization means comprise a seventh transistor whose emitter is connected to the first power supply terminal, whose collector is connected to the output terminal of the voltage control means and whose base is connected to the base of one of the transistors constituting the first and second current mirrors.

These and other aspects of the invention are apparent from and will be elucidated with reference to the embodiment described hereinafter.

DETAILED DESCRIPTION OF THE PREFERRED EMBODIMENT

Figure 1:
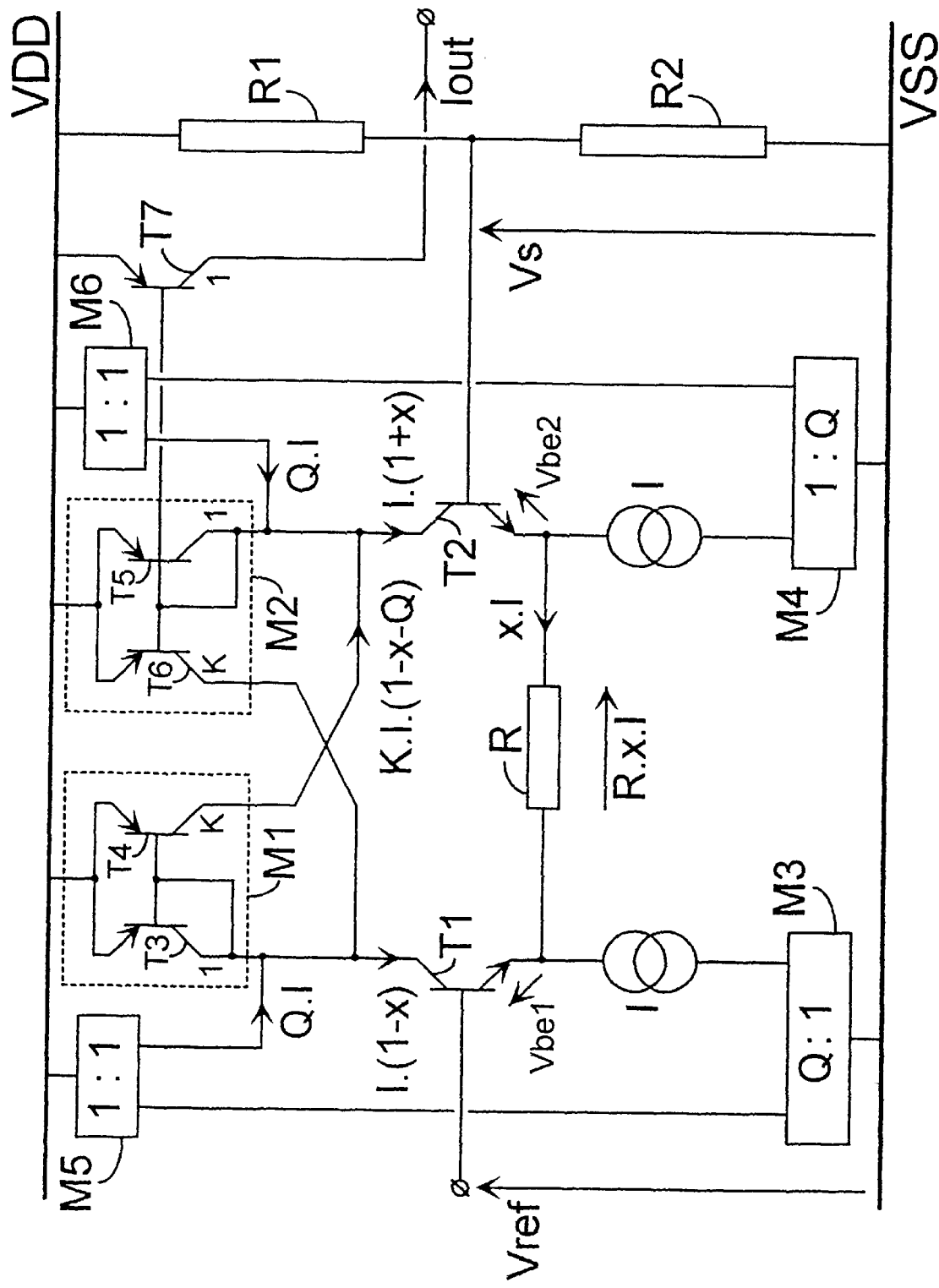
FIG. 1 is a circuit diagram showing an advantageous embodiment of a voltage control means according to the invention.

The voltage control means according to the invention, shown in FIG. 1, has a first power supply terminal VDD and a second power supply terminal VSS and an output terminal. It is provided with a first transistor T1 and a second transistor T2 constituting a differential pair, whose emitters are connected by means of a connection, the base of the first transistor being intended to receive a reference voltage Vref, the base of the second transistor being intended to receive a predetermined fraction Vs of a voltage applied to the first power supply terminal VDD. This voltage Vs is taken from the intermediate node of a divider bridge constituted by two resistors R1 and R2 arranged in series between the first power supply terminal VDD and the second power supply terminal VSS. The voltage control means is also provided with a first current mirror M1 and a second current mirror M2, each having a power supply point, an input branch intended to receive an input current and an output branch intended to supply an output current. The first current mirror M1 is constituted by a third transistor T3 and a fourth transistor T4, and the second current mirror M2 is constituted by a fifth transistor T5 and a sixth transistor T6. The fourth and sixth transistors T4 and T6 are K times larger than the third and fifth transistors T3 and T5, respectively. The bases of the fourth and sixth transistors T4 and T6 are connected to the bases and the collectors of the third and fifth transistors T3 and T5, respectively. The emitters of the third and fifth transistors T3 and T5, connected to the emitters of the fourth and sixth transistors T4 and T6, respectively, constitute the power supply points of the first current mirror M1 and the second current mirror M2, which power supply points are connected to the first power supply terminal VDD. The collectors of the third and fifth transistors T3 and T5 constitute the input branches of the first and second current mirrors M1 and M2, respectively, and the collectors of the fourth and sixth transistors T4 and T6 constitute the output branches of the first and second current mirrors M1 and M2, respectively. The input branches of the first and second current mirrors M1 and M2 are connected to the collectors of the first and second transistors T1 and T2, respectively. The output branches of the first and second current mirrors M1 and M2 are connected to the collectors of the second and first transistors T2 and T1, respectively. A resistor R is inserted in the connection between the emitters of the first and the second transistors T1 and T2, which emitters are connected to the second power supply terminal VSS via current sources each supplying a bias current I. The voltage control means comprises a third current mirror M3, a fourth current mirror M4, a fifth current mirror M5 and a sixth current mirror M6, each having a power supply point, an input branch intended to receive an input current and an output branch intended to supply an output current. The input branch of the third current mirror M3 and that of the fourth current mirror M4 are intended to receive the bias current I from the first transistor T1 and the second transistor T2, respectively. The power supply points of the third and fourth current mirrors M3 and M4 are connected to the second power supply terminal VSS. The input branches of the fifth and sixth current mirrors M5 and M6 are connected to the output branches of the third and fourth current mirrors M3 and M4, respectively. The output branches of the fifth and sixth current mirrors M5 and M6 are connected to the collectors of the first and second transistors T1 and T2. The power supply points of the fifth and sixth current mirrors M5 and M6 are connected to the first power supply terminal VDD. The third current mirror M3 and the fourth current mirror M4 are constructed in such a way that their output current is equal to Q times their input current. The fifth current mirror M5 and the sixth current mirror M6 are constructed in such a way that their output current is equal to their input current. The first and second transistors are NPN transistors, the third current mirror M3 and the fourth current mirror M4 are constituted by NPN transistors, and the first current mirror M1, the second current mirror M2, the fifth current mirror M5 and the sixth current mirror M6 are constituted by PNP transistors. The voltage control means also includes a seventh transistor T7 of the PNP type, whose emitter is connected to the first power supply terminal VDD, whose collector is connected to the output terminal of the voltage control means and whose base is connected to the bases of the fifth and sixth transistors T5 and T6, respectively, which constitute the second current mirror M2.

The operation of such a voltage control means may be described as follows: when the reference voltage Vref is much higher than Vs, the first transistor T1 is turned on and the second transistor T2 is turned off. The current flowing through the first transistor T1 thus has a value which is twice that of the bias current, i.e. 2.I, and the current I flows through the resistor in a direction opposite to that shown in FIG. 1. The output branch of the first current mirror M1 is thus potentially capable of supplying a strong current having a value of 2.K.I.(1−Q) to the collector of the second transistor T2 and thus of short-circuiting the second current mirror M2. The output current Iout of the seventh transistor T7, reflected by the current flowing through the fifth transistor T5, is thus zero. As the voltage Vs increases, the differential pair (T1, T2) approaches the equilibrium and the value of the current flowing through the first transistor T1 decreases, whereas the value of the current flowing through the second transistor T2 increases. When Vs becomes sufficiently large with regard to the reference voltage Vref, the second transistor T2 is more conducting than the first transistor T1 and the current flowing through the resistor R changes direction and takes the direction shown in FIG. 1. The fifth transistor T5 of the second current mirror M2 starts conducting when the collector current of the second transistor T2 exceeds the output current of the first current mirror M1 to which is added the current which is injected in said collector by means of the sixth current mirror M6. This constitutes the condition for turning on the seventh transistor T7, which signalizes whether the voltage applied to the first power supply terminal VDD has exceeded the high threshold of the voltage control means. This condition may be written as Q.I+K.I.(1−x−Q)=I.(1+x), or:

$$x=((K-1).(1-Q))/(1+K) \qquad (1)$$

At the switching instant, Vs=Vref+R.x.I+Vbe2−Vbe1, in which Vbe2 and Vbe1 are the base-emitter voltages of the first and second transistors T1 and T2, respectively. Moreover, Vbe2−Vbe1=Vt.ln(I(T2)/I(T1)), if I(T1) and I(T2) denote the currents flowing through the first and second transistors T1 and T2, respectively, which, in the case shown in the Figure, are equal to I.(1−x) and I.(1+x), respectively. The threshold S1 which Vs must reach to turn on the seventh transistor T7 can thus be written as:

$$S1=Vref+R.x.I+Vt. \ln ((1+x)/(1-x))$$

An identical reasoning leads to the expression of the threshold S2 which Vs must reach to turn off the seventh transistor T7:

$$S1=Vref-R.x.I-Vt. \ln (1+x)/(1-x))$$

The thresholds thus obtained comprise a component Vref±R.x.I which is independent of the temperature and a component Vt.ln((1+x)/(1−x)) which is dependent on the temperature, whose influence can be minimized by a judicious choice of the parameters K and Q. This choice represents a compromise between the maximum desired precision of the regulation and a minimum complexity of the voltage control means, which results in a minimum silicon surface for realizing said control means. If, for example, K=2 and Q=⅔ are chosen, relation 1 yields x=⅙. The threshold S1 can thus be written as S1=Vref+R.x.I.Vt.ln (10/8). If R1 and R2 have the same nominal values, then VDD=2.Vs, and the current Iout is thus zero until VDD exceeds 2.(Vref+R.x.I+Vt.ln(10/8)). The value of Vt.ln(10/8) is not much different from 5.8 mV. At a reference voltage of 1.2 V, which is the current value for a voltage supplied by a voltage generator of the bandgap type, and a dimensioning of the resistor R and current sources each supplying a bias current I such that (R.I)/9 is equal to 30.2 mV, the high threshold V1 which VDD must reach to turn on the seventh transistor T7 will thus have a value of 2.4V+72 mV, and the low threshold V2 which VDD must reach to turn off the seventh transistor T7 will have a value of 2.4V−72 mV, which represents a hysteresis of 144 mV. Moreover, within this hysteresis, the component which is dependent on the temperature is of the order of 24 mV, while the component which is independent of the temperature is of the order of 120 mV.

The advantages of the invention are clearly apparent from a comparison with the known voltage control means. Only a hysteresis of 72 mV with a factor K which is equal to 4 can be obtained with the known voltage control means. Moreover, this hysteresis is entirely dependent on the temperature. The amplitude of the variation of the switching thresholds as a function of the temperature is thus approximately five times larger in the known control means than in the voltage control means in accordance with the above-described embodiment of the invention.

I claim:

1. A voltage control means having a first and a second power supply terminal and an output terminal, provided with a first and a second transistor constituting a differential pair, whose emitters are connected by means of a connection, the base of the first transistor being intended to receive a reference voltage, the base of the second transistor being intended to receive a predetermined fraction of a voltage applied to the first power supply terminal, said voltage control means being also provided with a first and a second current mirror each having a power supply point connected to the first power supply terminal, an input branch intended to receive an input current and an output branch intended to supply an output current, each current mirror being constructed in such a way that its output current is equal to K times its input current, in which K is a predetermined real number, the input branches of the first and second current mirrors being connected to the collectors of the first and second transistors, respectively, the output branches of the first and second current mirrors being connected to the collectors of the second and first transistors, respectively, characterized in that a resistor is inserted in the connection between the emitters of the first and second transistors, which emitters are connected to the second power supply terminal via current sources each supplying a bias current, in that said voltage control means is provided with injection means for injecting into the collector of each first and second transistor a current equal to Q times said bias current, in which Q is a predetermined real number, and in that said voltage control means is provided with signalization means allowing supply of a current at said output terminal, which current is proportional to the input current of one of the first or second current mirrors.

2. A voltage control means as claimed in claim 1, characterized in that the injection means comprise a third, a fourth, a fifth and a sixth current mirror, each having a power supply point, an input branch intended to receive an input current, and an output branch intended to supply an output current, the input branch of each third and fourth current mirror being intended to receive the bias current of the first and the second transistor, respectively, the power supply points of the third and fourth current mirrors being connected to the second power supply terminal, the input branches of the fifth and sixth current mirrors being connected to the output branches of the third and fourth current mirrors, respectively, the output branches of the fifth and sixth current mirrors being connected to the collectors of the first and second transistors, respectively, the power supply points of the fifth and sixth current mirrors being connected to the first power supply terminal, the third, fourth, fifth and sixth current mirrors being constructed in such a way that the output currents of the fifth and sixth current mirrors are equal to Q times the input currents of the third and fourth current mirrors, respectively.

3. A voltage control means as claimed in claim 2, characterized in that the third and fourth current mirrors are constructed in such a way that their output current is equal to Q times their input current, and in that the fifth and sixth current mirrors are constructed in such a way that their output current is equal to their input current.

4. A voltage control means as claimed in claim 2, characterized in that, the first and second transistors having a given polarity, the third and fourth current mirrors are constituted by transistors all having the same polarity as the first and second transistors, and in that the first, second, fifth and sixth current mirrors are constituted by transistors all having a polarity which is inverse to that of the first and second transistors.

5. A voltage control means as claimed in claim 4, characterized in that the first and second transistors are NPN transistors.

6. A voltage control means as claimed in claim 1, in which the first current mirror is constituted by a third and a fourth transistor and the second current mirror is constituted by a fifth and a sixth transistor, the fourth and sixth transistors being K times larger than the third and fifth transistors, respectively, the bases of the fourth and sixth transistors being connected to the bases and collectors of the third and fifth transistors, respectively, the emitters of the third and fifth transistors being connected to the emitters of the fourth and sixth transistors, respectively, and constituting the power supply points of the first and second current mirrors, respectively, said power supply points being connected to the first power supply terminal, the collectors of the third and fifth transistors constituting the input branches of the first and second current mirrors, respectively, the collectors of the fourth and sixth transistors constituting the output branches of the first and second current mirrors, respectively, characterized in that the signalization means comprise a seventh transistor whose emitter is connected to the first power supply terminal, whose collector is connected to the output terminal of the voltage control means and whose base is connected to the base of one of the transistors constituting the first and second current mirrors.

* * * * *